United States Patent
Kimura et al.

(10) Patent No.: US 12,355,301 B2
(45) Date of Patent: Jul. 8, 2025

(54) STATOR FOR ROTATING ELECTRICAL MACHINE, ROTATING ELECTRICAL MACHINE, METHOD FOR MANUFACTURING STATOR FOR ROTATING ELECTRICAL MACHINE, AND METHOD FOR MANUFACTURING ROTATING ELECTRICAL MACHINE

(71) Applicant: Proterial. Ltd., Tokyo (JP)

(72) Inventors: Mamoru Kimura, Tokyo (JP); Hirohisa Sano, Tokyo (JP); Kyohei Aimuta, Tokyo (JP); Toshio Abe, Tokyo (JP); Motoki Ohta, Tokyo (JP)

(73) Assignee: Proterial, Ltd., Tokyo (JP)

( * ) Notice: Subject to any disclaimer, the term of this patent is extended or adjusted under 35 U.S.C. 154(b) by 484 days.

(21) Appl. No.: 17/760,766

(22) PCT Filed: Sep. 23, 2020

(86) PCT No.: PCT/JP2020/035856
§ 371 (c)(1),
(2) Date: Mar. 16, 2022

(87) PCT Pub. No.: WO2021/060298
PCT Pub. Date: Apr. 1, 2021

(65) Prior Publication Data
US 2022/0344980 A1    Oct. 27, 2022

(30) Foreign Application Priority Data

Sep. 24, 2019  (JP) ................................. 2019-172812
Mar. 17, 2020  (JP) ................................. 2020-046196

(51) Int. Cl.
*H02K 1/02* (2006.01)
*H02K 1/14* (2006.01)
*H02K 15/022* (2025.01)

(52) U.S. Cl.
CPC ............... *H02K 1/02* (2013.01); *H02K 1/146* (2013.01); *H02K 15/022* (2013.01); *H02K 2213/03* (2013.01)

(58) Field of Classification Search
CPC .......... H02K 1/02; H02K 1/146; H02K 1/148; H02K 1/16; H02K 1/165; H02K 1/18;
(Continued)

(56) References Cited

U.S. PATENT DOCUMENTS

| | | | |
|---|---|---|---|
| 2009/0152956 A1* | 6/2009 | Yang | H02K 1/08 310/44 |
| 2010/0019589 A1* | 1/2010 | Saban | H02K 5/1285 310/216.069 |

(Continued)

FOREIGN PATENT DOCUMENTS

| | | |
|---|---|---|
| JP | 2010207028 | 9/2010 |
| JP | 2014155347 | 8/2014 |

(Continued)

OTHER PUBLICATIONS

"International Search Report (Form PCT/ISA/210) of PCT/JP2020/035856," mailed on Nov. 10, 2020, with English translation thereof, pp. 1-4.

*Primary Examiner* — Michael Andrews
(74) *Attorney, Agent, or Firm* — JCIPRNET

(57) ABSTRACT

The stator for a rotating electrical machine includes an annular first iron core part, which is a stacked body including electrical steel plates, and second iron core part, which is a stacked body including an amorphous soft magnetic metal or a nanocrystalline soft magnetic metal, wherein: the annular first iron core part includes a plurality of tooth parts which protrude toward the inner circumferential side and around which a coil is wound, and first groove parts formed within each tooth part from an outer circumferential surface;

(Continued)

and the second iron core parts are disposed in the first groove parts.

8 Claims, 3 Drawing Sheets

(58) Field of Classification Search
CPC ... H02K 1/185; H02K 15/022; H02K 2213/03
USPC .......... 310/179, 216.069, 216.071, 216.074, 310/216.076, 216.077, 216.088
See application file for complete search history.

(56) References Cited

U.S. PATENT DOCUMENTS

| 2019/0081519 A1* | 3/2019 | Baba | H02K 1/08 |
| 2019/0081521 A1* | 3/2019 | Baba | H02K 1/276 |
| 2019/0229564 A1* | 7/2019 | Nigo | H02K 1/02 |

FOREIGN PATENT DOCUMENTS

| JP | 2019068567 | 4/2019 |
| WO | 2017208290 | 12/2017 |
| WO | 2018069956 | 4/2018 |
| WO | 2019064630 | 4/2019 |

* cited by examiner

STATOR FOR ROTATING ELECTRICAL MACHINE, ROTATING ELECTRICAL MACHINE, METHOD FOR MANUFACTURING STATOR FOR ROTATING ELECTRICAL MACHINE, AND METHOD FOR MANUFACTURING ROTATING ELECTRICAL MACHINE

CROSS-REFERENCE TO RELATED APPLICATION

This application is a 371 of international application of PCT application serial no. PCT/JP2020/035856, filed on Sep. 23, 2020, which claims the priority benefit of Japan application no. 2019-172812 filed on Sep. 24, 2019 and Japan application no. 2020-046196 filed on Mar. 17, 2020. The entirety of each of the above-mentioned patent applications is hereby incorporated by reference herein and made a part of this specification.

TECHNICAL FIELD

The present invention relates to a rotating electrical machine having a rotor which rotates around a rotation axis and a circular tube-shaped stator disposed around the rotor, a stator for a rotating electrical machine, a method for manufacturing a stator for a rotating electrical machine, and a method for manufacturing a rotating electrical machine.

BACKGROUND ART

In recent years, rotating electrical machines such as motors and generators have been required to be smaller and more efficient, and as a material of a stator around which a coil is wound, a soft magnetic material having small iron loss, for example, an amorphous soft magnetic metal or a nanocrystalline soft magnetic metal, may be used instead of a conventional electrical steel sheet.

A rotating electrical machine (for example, Patent Literature 1) in which a stator part (a tooth part) around which a coil is wound is made of an amorphous soft magnetic metal, and a rotating electrical machine (for example, Patent Literature 2) in which an amorphous soft magnetic metal is disposed in an insertion hole of a stator made of an electrical steel plate are known as rotating electrical machines in which the above material is used for the stator.

CITATION LIST

Patent Literature

Patent Literature 1

Japanese Patent Laid-Open No. 2019-68567

Patent Literature 2

PCT International Publication No. WO2017/208290

SUMMARY OF INVENTION

Technical Problem

When the stator is a stacked body including thin plates, a plate thickness of the amorphous soft magnetic metal or the nanocrystalline soft magnetic metal is, for example, about 0.015 to 0.030 mm which is thinner than 0.5 mm and 0.35 mm of the general electromagnetic steel sheet, and has a Vickers hardness of about 900 which is five times or more that of the electromagnetic steel sheet, and the formed stator has low toughness which may cause chipping or cracking.

Therefore, in the rotating electrical machine of Patent Literature 1, since the stator of the stacked body is exposed on the rotor side, the stacked body may be chipped or cracked, and a part of the stator may come into contact with the rotor. That is, from the viewpoint of destruction of the rotating electrical machine, there is a possibility of the rotating electrical machine having low reliability. In addition, since the amorphous soft magnetic metal or the nanocrystalline soft magnetic metal has high magnetic permeability but has low saturation magnetic flux density, when the stator is configured only of the amorphous soft magnetic metal or the nanocrystalline soft magnetic metal, an amount of magnetic flux inside the stator may be saturated, and characteristics of the rotating electrical machine may deteriorate.

Further, in the rotating electrical machine of Patent Literature 2, a stacked body of the amorphous soft magnetic metal is disposed in an insertion hole of a first iron core part configured of a stacked body including electromagnetic steel sheets. That is, the first iron core part in which chipping or cracking is unlikely to occur is disposed around a second iron core part in which chipping or cracking is likely to occur. In this way, the problem of magnetic saturation in Patent Literature 1 can be suppressed, but in order to insert the second iron core part having a rectangular shape into the insertion hole having a rectangular shape, a clearance is required on each side of the rectangular shape, and the clearance may become a gap in a magnetic circuit and may result in a large decrease in the maximum torque of the rotating electrical machine.

Therefore, the present invention provides a rotating electrical machine having a stator in which a second iron core part that is a stacked body including an amorphous soft magnetic metal or a nanocrystalline soft magnetic metal is disposed in a first iron core part that is a stacked body including electrical steel sheets and having excellent characteristics and reliability, a stator for a rotating electrical machine, a method for manufacturing a stator for a rotating electrical machine, and a method for manufacturing a rotating electrical machine.

Solution to Problem

The present invention is a stator for a rotating electrical machine, wherein the stator includes an annular first iron core part which is a stacked body including electrical steel sheets and a second iron core part which is a stacked body including an amorphous soft magnetic metal or a nanocrystalline soft magnetic metal, the annular first iron core part includes a plurality of tooth parts which protrudes toward an inner peripheral side and on which a coil is wound, and a first groove part formed in the tooth parts from an outer peripheral surface of each of the plurality of tooth parts, and the second iron core part is disposed in the first groove part.

Further, the first groove part may have a shape in which a width is constant or gradually narrows from an outer surface side of the first iron core part toward a tip end inside the tooth part.

Further, a width of a bottom portion of the first groove part may be 20% or more of a width of a thinnest portion of the tooth parts.

Further, the first groove part may be closed at both end sides of the first iron core part in a stacking direction.

Further, the stator may include a third iron core part which is a stacked body including an amorphous soft magnetic metal or a nanocrystalline soft magnetic metal, the first iron core part may have a plurality of second groove parts formed on an outer peripheral side of the slot part in a cross-sectional view perpendicular to the stacking direction of the first iron core part, and the third iron core part may be disposed in the second groove parts.

A rotating electrical machine of the present invention includes a rotor which rotates around a rotation axis and the stator disposed around the rotor.

Further, a method for manufacturing a stator according to the present invention is a method for manufacturing the stator, in which, when the stator is formed, the second iron core part is inserted into the first groove part from an outer peripheral surface side of the first iron core part.

In the method for manufacturing a stator, the second iron core part may be paired and inserted into a pair of the first groove parts which sandwich a central axis.

According to a method for manufacturing a rotating electrical machine of the present invention, the rotating electrical machine is manufactured by combining the stator with a rotor.

Advantageous Effects of Invention

According to the present invention, it is possible to provide a rotating electrical machine having a stator in which a second iron core part that is a stacked body including an amorphous soft magnetic metal or a nanocrystalline soft magnetic metal is disposed in a first iron core part that is a stacked body including electrical steel sheets and having excellent characteristics and reliability, a stator for a rotating electrical machine, a method for manufacturing a stator for a rotating electrical machine, and a method for manufacturing a rotating electrical machine.

DESCRIPTION OF EMBODIMENTS

Hereinafter, embodiments of the present invention will be described in detail with reference to the accompanying drawings.

First Embodiment

Figure 1:
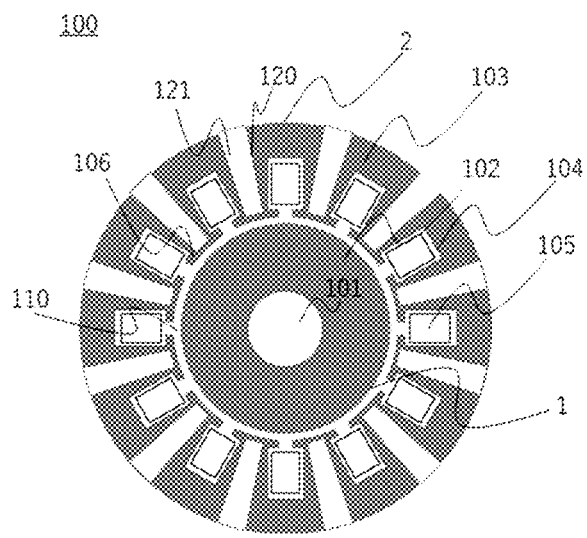
FIG. 1 is a schematic cross-sectional view perpendicular to a rotation axis of a rotating electrical machine 100 according to a first embodiment of the present invention.

A rotating electrical machine 100 of the present embodiment schematically has a columnar shape having a rotation axis as an axis of symmetry and includes a cylindrical rotor 1 including a shaft 101 as a rotating shaft and a rotor iron core 102 disposed around the shaft 101, and an annular stator 2 disposed around an outer diameter side of the rotor 1 to face the rotor 1 via a gap 110, as illustrated in the cross-sectional view of FIG. 1. Further, the stator 2 includes a first iron core part 103 and a second iron core part 121.

A plurality of slot parts 104, tooth parts 106, and groove parts 120 are formed in the first iron core part 103 with the rotation axis (a central axis) as the axis of symmetry. Each of the groove parts 120 extends in an axial direction of the rotation axis, that is, in a stacking direction of the first iron core parts 103. The slot parts 104 for disposing a coil conducting wire can be disposed between the adjacent tooth parts 106. The coil 105 is disposed to pass through the slot parts 104 on both sides of each of the tooth parts 106 and to wind around each of the tooth parts 106. Additionally, the second iron core part 121 is disposed in each of the groove parts 120. Although not illustrated, a frame, a bearing, a cooling structure, and the like are disposed around the stator 2.

Here, a stacked body including thin plates punched from a thin plate of an electrical steel plate into a shape of the first iron core part 103 of FIG. 1 can be used as the first iron core part 103.

Further, a stacked body including thin plates punched into the shape of the second iron core part 121 of FIG. 1 from a thin plate of an amorphous soft magnetic metal or a nanocrystalline soft magnetic metal having higher magnetic permeability than an electromagnetic steel sheet can be used for the second iron core part 121. That is, a stacked body including thin plates punched into the shape of the second iron core part 121 illustrated in FIG. 1 from a thin plate of a thin strip-shaped amorphous soft magnetic metal (an amorphous alloy) obtained by quenching a molten metal, a nanocrystalline soft magnetic metal (a nanocrystal alloy) obtained by subjecting the thin strip-shaped amorphous soft magnetic metal to a heat treatment to have crystallized nanocrystals, more specifically, an Fe-based amorphous alloy (an Fe—Si—B-based alloy, or the like), an Fe-based nanocrystalline alloy (an Fe—Si—B—Cu—Nb-based alloy, or the like), or an Fe-based nanocrystalline alloy (an Fe—Si—B—Nb—Cu—Ni-based alloy, or the like) can be used. It is known that the stacked bodies of such metals have low toughness and are prone to chipping and cracking. That is, according to the configuration of the present embodiment, it is possible to realize both the above-described property improvement and high reliability.

Further, the groove parts 120 are formed in each of the tooth parts 106 from an outer surface of a ring of the first iron core part 103. Various shapes can be adopted for each of the groove parts 120, but in the present embodiment, each of the groove parts 120 is formed in a shape in which a width gradually narrows from the outer surface side toward a tip end inside the tooth parts 106. Then, the second iron core part 121 is disposed to fit into the groove parts 120.

Here, in the rotating electrical machine 100 of the present embodiment, the second iron core part 121 which is a stacked body of an amorphous soft magnetic metal or a nanocrystalline soft magnetic metal is disposed in the tooth parts 106 of the first iron core part 103 which is a stacked body of an electrical steel sheet. In this way, it is possible to suppress the magnetic saturation of the stator 2 caused by the second iron core part 121, and it is possible to suppress a decrease in an amount of leakage of the magnetic flux from the stator 2 to the rotor 1. That is, it is possible to obtain a highly efficient rotating electrical machine 100 having more excellent characteristics.

Further, the rotating electrical machine 100 of the present embodiment has the groove parts 120 each having a shape in which the width gradually narrows from the outer surface side of the first iron core part 103 toward the tip end inside the tooth parts 106. The second iron core part 121 having substantially the same shape as the groove parts 120 is disposed in the groove parts 120. In this way, the second iron core part 121 can be inserted and fitted into the groove parts 120 from the outer surface side of the first iron core part 103, and the groove parts 120 and the second iron core part 121 can be disposed in close contact with each other. Thus, it is possible to suppress a decrease in maximum torque due to a gap, and it is possible to obtain the rotating electrical machine 100 having more excellent characteristics and large maximum torque.

Further, in the rotating electrical machine 100 of the present embodiment, the second iron core part 121 made of an amorphous soft magnetic metal which is easily chipped or cracked is disposed in the tooth parts 106 of the first iron core part 103 made of an electromagnetic steel sheet which is less likely to be chipped or cracked. In this way, even when a part of the stator 2 is chipped or cracked, it is possible to suppress the contact between the stator and the rotor 1, and it is possible to obtain the rotating electrical machine 100 having higher reliability.

In the rotating electrical machine 100 of the present embodiment, the coil 105 can be used in both distributed winding or centralized winding. Further, the number of tooth parts 106 is not limited to 12 as illustrated in FIG. 1 and may be set to an appropriate number according to the number of poles of the rotor 1. Further, the shapes of the tooth parts 106 are not limited to semi-closed slots as illustrated in FIG. 1 and may also be wedge-shaped open slots or fully closed slots which are difficult to process by a conventional method using an amorphous soft magnetic metal as teeth.

Figure 2:
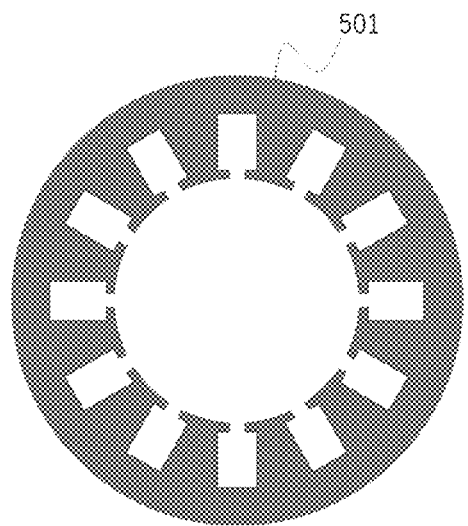
FIG. 2 is a thin plate shape which can be used at both ends of a stacked body of a first iron core part of the rotating electrical machine 100 according to the first embodiment of the present invention.

In the rotating electrical machine 100 of the present embodiment, when the first iron core part 103 is configured of a stacked body stacked in a direction of the rotation axis, both ends of the groove part 120 in the stacking direction, that is, both ends in the direction of the rotation axis can be closed by thin plates at both ends of the stacked body. For example, the thin plates excluding both ends of the stacked body may be formed in the shape of the first iron core part 103 illustrated in FIG. 1, and the thin plates at both ends of the stacked body may be formed in a shape of a thin plate 501 illustrated in FIG. 2 without the shape of the groove part 120.

In this way, when the second iron core part 121 is disposed in the groove part 120, the thin plates at both ends of the stack, that is, at both ends in the direction of the rotation axis can be used as a guide, and the second iron core part 121 can be easily inserted from the outer peripheral surface side of the first iron core part 103.

Further, even when the second iron core part 121 is disposed in the groove part 120 and then the second iron core part is chipped or cracked, it is possible to prevent it from protruding in the stacking direction, and the contact between the rotor 1 and the stator 2 can be further suppressed. That is, the rotating electrical machine 100 having higher reliability can be obtained.

Further, when the second iron core part 121 is configured of a stacked body, the second iron core part 121 can be sandwiched in the stacking direction by the thin plates at both ends of the stack. Thus, it is possible to suppress spacing of the stack of the stacked body of the second iron core part 121, to suppress deterioration of the characteristics of the second iron core part 121, and to obtain the rotating electrical machine 100 having more excellent characteristics.

Figure 3:
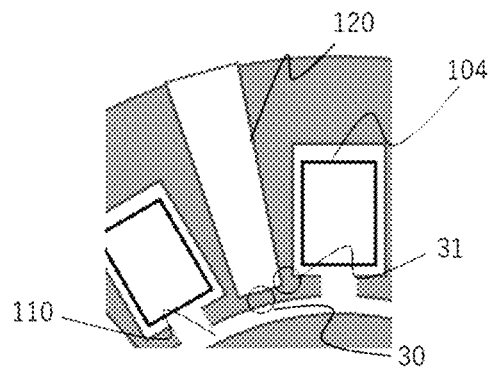
FIG. 3 is a partially enlarged view of a tip end of a tooth part of FIG. 1.
Figure 7:
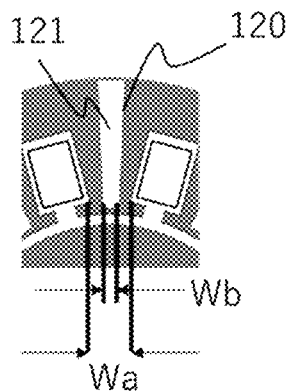
FIG. 7 is a diagram illustrating a width Wb of a bottom portion of a groove part 120 and a width Wa of the thinnest portion of a tooth part 106.

Further, in the rotating electrical machine 100 of the present embodiment, as illustrated in the partially enlarged view of FIG. 3, preferably, a dimension of a tip end portion 30 of the tooth part 106, that is, the tooth part 106 sandwiched between the groove part 120 and the gap 110, and a dimension of a side surface portion 31 of the tooth part 106, that is, the tooth part 106 sandwiched between the groove part 120 and the slot part 104 are made as small as possible within a range in which processing accuracy and material strength are allowed. Specifically, as illustrated in FIG. 7, a width Wb of the bottom portion of the groove part 120 in a circumferential direction is preferably 20% or more and more preferably 50% or more with respect to a width Wa of the thinnest portion of the tooth part 106. Further, the width Wb of the bottom portion of the groove part 120 may be set to 80% or less of a plate thickness of the first iron core part 103, for example, in order to give the tooth part sufficient strength.

Second Embodiment

Next, a rotating electrical machine 200 which is a second embodiment of the present invention will be described. The present embodiment is a modification of a part of the first embodiment, and in the drawing, the same parts as those of the first embodiment are designated by the same reference numerals.

Figure 4:
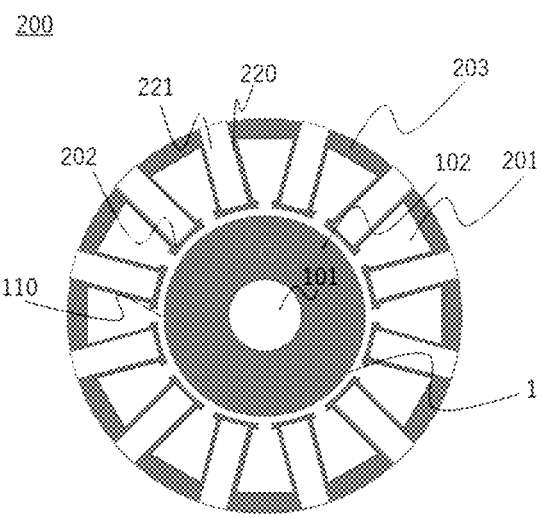
FIG. 4 is a schematic cross-sectional view perpendicular to a rotation axis of a rotating electrical machine 200 according to a second embodiment of the present invention.

As illustrated in the cross-sectional view of FIG. 4, in the rotating electrical machine 200 of the present embodiment, a shape of a groove part 220 of a first iron core part 203 and a shape of a second iron core part 221 are different from those of the rotating electrical machine 100 of the first embodiment. Additionally, in the rotating electrical machine 200 of the present embodiment, the groove part 220 having a monospaced width is formed from the outer surface side of the first iron core part 203 toward a tip end inside a tooth part 202, and the rectangular second iron core part 221 is disposed in the groove part 220. In this way, the second iron core part 221 may be formed to have a simple shape, and the rotating electrical machine 200 can be more easily manufactured.

Third Embodiment

Next, a rotating electrical machine 300 which is a third embodiment of the present invention will be described. The present embodiment is a modification of a part of the first embodiment, and in the drawing, the same parts as those of the first embodiment are designated by the same reference numerals.

Figure 5:
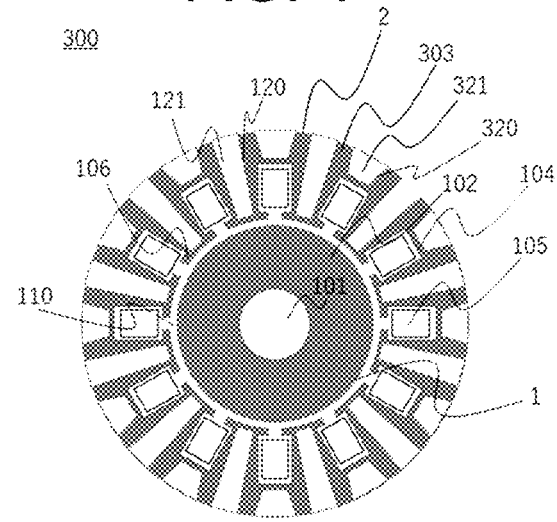
FIG. 5 is a schematic cross-sectional view perpendicular to a rotation axis of a rotating electrical machine 300 according to a third embodiment of the present invention.

As illustrated in the cross-sectional view of FIG. 5, in the rotating electrical machine 300 of the present embodiment, a shape of a first iron core part 303 is different from that in the rotating electrical machine 100 of the first embodiment. Additionally, in the rotating electrical machine 300 of the present embodiment, a plurality of second groove parts 320 is formed between the groove parts 120 on the outer peripheral surface of the first iron core part 303, that is, on the outer peripheral side of the slot part 104, and extends in the stacking direction of the first iron core parts, that is, in the direction of the rotation axis. A third iron core part 321 is disposed in each of the second groove parts 320.

The third iron core part 321 may be a stacked body including an Fe-based amorphous alloy or an Fe-based nanocrystal alloy as in the second iron core part. In this way, conventionally, since the magnetic flux flows the shortest distance, the magnetic flux concentrated in the vicinity of the slot part 104 flows more to the third iron core part 321 by providing the third iron core part 321 having high magnetic permeability, thus, the concentration of the magnetic flux can be reduced, the iron loss of the stator 2 can be reduced due to a difference in the materials, and the rotating electrical machine 300 having more excellent characteristics can be obtained.

Fourth Embodiment

Next, as a fourth embodiment of the present invention, a method for manufacturing the rotating electrical machine 100 of the first embodiment will be described.

The method for manufacturing the rotating electrical machine 100 is characterized by including a process of forming the stator 2, a process of forming the rotor 1, and a process of combining the stator 2 and the rotor 1.

Figure 6:
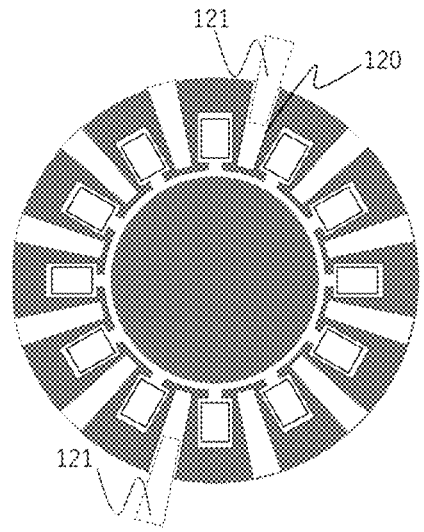
FIG. 6 is a diagram illustrating a method for manufacturing a rotating electrical machine 100 according to a fourth embodiment of the present invention.

Further, in the process of forming the stator 2, as illustrated in FIG. 6, it is preferable to insert the second iron core part 121 into the groove part 120 from the outer peripheral surface side of the first iron core part.

In this way, the second iron core part 121 can be easily fitted and disposed in the first iron core part 103, and the stator 2 can be easily assembled so that a gap between the first iron core part 103 and the second iron core part 121 becomes small.

Further, when the second iron core part 121 is inserted, as illustrated in FIG. 6, more preferably, the second iron core parts 121 are paired and inserted into a pair of groove parts 120 which sandwich the rotation axis. That is, the second iron core parts 121 are simultaneously inserted from the outer peripheral side into the pair of groove parts 120 which face each other to sandwich the central axis (the rotation axis). In this way, the second iron core part 121 can be easily fitted and disposed while deformation of the first iron core part 103 is suppressed.

Further, the third iron core part 321 can also be inserted into the second groove part 320 from the outer peripheral surface side of the first iron core part in the same manner as the second iron core part 121. Further, the third iron core parts 321 may be paired and inserted into the pair of second groove parts 320 which sandwich the rotation axis.

Next, results of studying the torque and loss with the width of the groove part as a parameter will be described.

Figure 8:
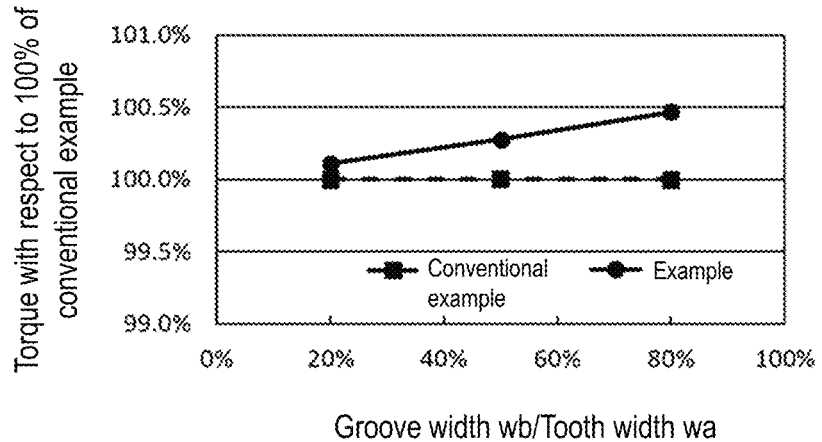
FIG. 8 is a diagram illustrating results of comparing torques of an example of the present invention and a conventional example.
Figure 9:
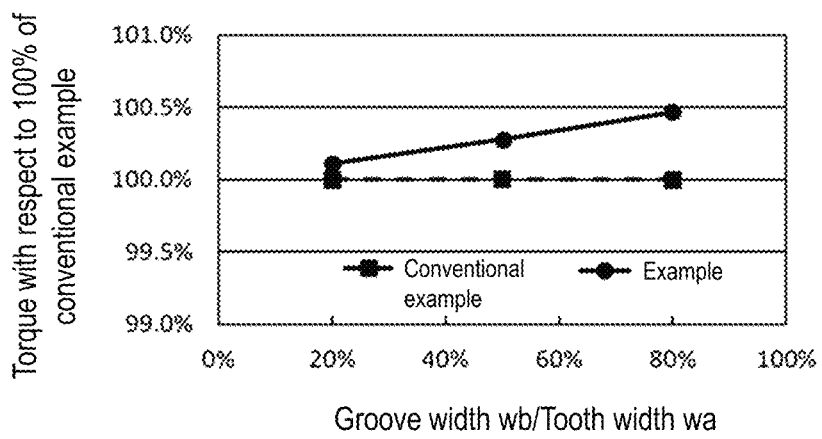
FIG. 9 is a diagram illustrating results of comparing losses of the example of the present invention and the conventional example.

FIGS. 8 and 9 are graphs of the torque and loss with a ratio (%) obtained by dividing the width Wb of the groove part by the width Wa of the thinnest portion of the tooth on a horizontal axis. The results of examination using a stator of which the whole is made of a silicon steel plate (a material equivalent to 35A300) as a conventional example and a second iron core part, which is made of an amorphous metal (2605HB1M (registered trademark): manufactured by Hitachi Metals, Ltd.), according to the width of the groove part as an example are shown. In contrast to the torque of the conventional example, in the example, the torque, which was about the same when the width Wb of the groove part is 20%, tends to increase by widening the width Wb of the groove part, and the torque is increased by 0.5% at 80% of the width of the groove part. Further, in contrast to the loss of the conventional example, in the example, the results that the loss is reduced by widening the width Wb of the groove, and when the width Wb of the groove is 20%, the loss is about 80%, and when the width Wb of the groove is 80%, the loss is 40%, and thus the loss can be significantly reduced by increasing the width Wb of the groove part was obtained.

Although the embodiments of the present invention have been described above, the present invention is not limited to the above embodiments. It is possible to change the above embodiments as appropriate within the technical scope described in the claims.

The invention claimed is:

1. A stator for a rotating electrical machine, wherein the stator comprises an annular first iron core part which is a stacked body including electrical steel sheets and a second iron core part which is a stacked body including an amorphous soft magnetic metal or a nanocrystalline soft magnetic metal,
wherein the annular first iron core part comprises a plurality of tooth parts which protrudes toward an inner peripheral side and on which a coil is wound, and a first groove part formed in each of the plurality of tooth parts from an outer peripheral surface of the annular first iron core part and extending from an outer surface side of the annular first iron core part toward a tip end inside each of the plurality of tooth parts, and
the second iron core part is disposed in the first groove part.

2. The stator according to claim 1, wherein the first groove part has a shape in which a width is constant or gradually narrows from the outer surface side of the annular first iron core part toward the tip end inside each of the plurality of tooth parts.

3. The stator according to claim 1, wherein a width of a bottom portion of the first groove part is 20% or more of a width of a thinnest portion of each of the plurality of tooth parts.

4. The stator according to claim 1, wherein the first groove part is closed at both end sides of the annular first iron core part in a stacking direction.

5. The stator according to claim 1, comprising a third iron core part which is a stacked body including an amorphous soft magnetic metal or a nanocrystalline soft magnetic metal,
wherein the annular first iron core part has a plurality of second groove parts formed on an outer peripheral side of a slot part in a cross-sectional view perpendicular to the stacking direction of the annular first iron core part, and
the third iron core part is disposed in the second groove parts.

6. A rotating electrical machine including a rotor which rotates around a rotation axis and the stator according to claim 1 disposed around the rotor.

7. A method for manufacturing the stator according to claim 1,
wherein, when the stator is formed, the second iron core part is inserted into the first groove part from an outer peripheral surface side of the annular first iron core part.

8. The method according to claim 7, wherein the second iron core part is paired and inserted into a pair of the first groove parts which sandwich a central axis.

\* \* \* \* \*